(12) United States Patent
Okuma

(10) Patent No.: US 6,640,921 B2
(45) Date of Patent: Nov. 4, 2003

(54) STRUCTURE FOR MOUNTING FUEL COCK IN MOTORCYCLE

(75) Inventor: Takanori Okuma, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,991

(22) Filed: Mar. 30, 2001

(65) Prior Publication Data

US 2001/0030072 A1 Oct. 18, 2001

(30) Foreign Application Priority Data

Mar. 31, 2000 (JP) ....................................... 2000-096803

(51) Int. Cl.[7] .............................................. B60K 15/00
(52) U.S. Cl. ....................................................... 180/219
(58) Field of Search ........................................... 180/219

(56) References Cited

U.S. PATENT DOCUMENTS

| | | | | |
|---|---|---|---|---|
| 4,557,671 A | * | 12/1985 | Motoki et al. | 417/328 |
| 4,577,719 A | * | 3/1986 | Nomura et al. | 180/219 |
| 4,653,762 A | * | 3/1987 | Nakamura et al. | 123/495 |
| 4,717,163 A | * | 1/1988 | Tsukiji | 137/576 |
| 4,781,264 A | * | 11/1988 | Matsuzaki et al. | 180/219 |
| 4,799,565 A | * | 1/1989 | Handa et al. | 180/296 |
| 5,012,883 A | * | 5/1991 | Hiramatsu | 180/219 |
| 5,145,023 A | * | 9/1992 | Tsurumi et al. | 180/229 |
| 5,147,077 A | * | 9/1992 | Nakajima et al. | 244/413 |
| 5,183,130 A | * | 2/1993 | Nakamura et al. | 180/219 |
| 6,213,514 B1 | * | 4/2001 | Natsume et al. | 280/833 |

FOREIGN PATENT DOCUMENTS

JP B285419 1/1996

* cited by examiner

Primary Examiner—Lesley D. Morris
Assistant Examiner—L. Lum
(74) Attorney, Agent, or Firm—Birch, Stewart, Kolasch & Birch, LLP

(57) ABSTRACT

A structural layout of a motorcycle concerning a fuel tank, a fuel cock, a carburetor, and an engine in relation to a frame is provided. A downward projecting portion is provided on a bottom of the fuel tank towards the rear. The projecting portion extends in a space defined behind a cylinder head and a cylinder head cover of the engine and in front of a rear cross member of the frame. The downward projection is juxtaposed with a carburetor across a motorcycle body. The fuel cock is manually accessible from beneath the one of right or left main frames of the frame.

16 Claims, 10 Drawing Sheets

STRUCTURE FOR MOUNTING FUEL COCK IN MOTORCYCLE

BACKGROUND OF THE INVENTION

1. Field of the Invention

The present invention relates to a structure for mounting a fuel cock in a motorcycle.

2. Description of the Relevant Art

Japanese Patent Publication No. Hei 8-5419 discloses a motorcycle, in which a fuel tank is supported on a pair of left and right main frames. The left and right mainframes extend above the engine, and along the length of the motorcycle. A recess is formed on the lower side surface of the fuel tank. The fuel cock is provided in the recess, and near the upper surface of the main frames.

In a design structuring of a motorcycle, a fuel tank should be provided at a lower level, so that the center of gravity of the motorcycle is positioned as low as possible. However, the position of the fuel tank is dependent upon the height of a cylinder head of an engine, in order to supply fuel from the fuel tank to a carburetor using gravity.

It may also be desirable to increase the capacity of the fuel tank, however, if the fuel tank is made tall to increase its capacity, a riding position or a seat shape will be affected. Further, the center of gravity of the motorcycle may vary extensively with an amount of fuel remaining in the fuel tank, or a rider's posture. Still further, when the fuel tank is positioned between the left and right main frames, it is difficult to attach a fuel cock at a position where it is easy to access and maintain.

SUMMARY OF THE INVENTION

It is an object of the present invention to overcome one or more of the drawbacks of the background art.

In order to accomplish the above-mentioned objects of the invention, there is provided a structure for mounting a fuel cock in a motorcycle in which a fuel tank is provided above an engine. A fuel cock and a carburetor are juxtaposed under a fuel tank and across a motorcycle body.

According to the invention, the fuel cock and the carburetor are juxtaposed across the motorcycle body, so that the fuel cock can be theoretically positioned at a lowest level, and the fuel tank has its rear part positioned under the center of the motorcycle body. This structure allows a riding position and a seat to be secured near the front part of the motorcycle body, increases the capacity of the fuel tank, and contributes to stabilizing the center of gravity of the motorcycle. Further, both the fuel cock and the carburetor are juxtaposed across the motorcycle body at the lower position thereof. This improves layout tolerance for the fuel cock. Still further, since the fuel cock is present at the lowest position of the fuel tank, little air will be sucked from the fuel tank as a fuel level varies when there is a small amount of fuel remaining in the fuel tank.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
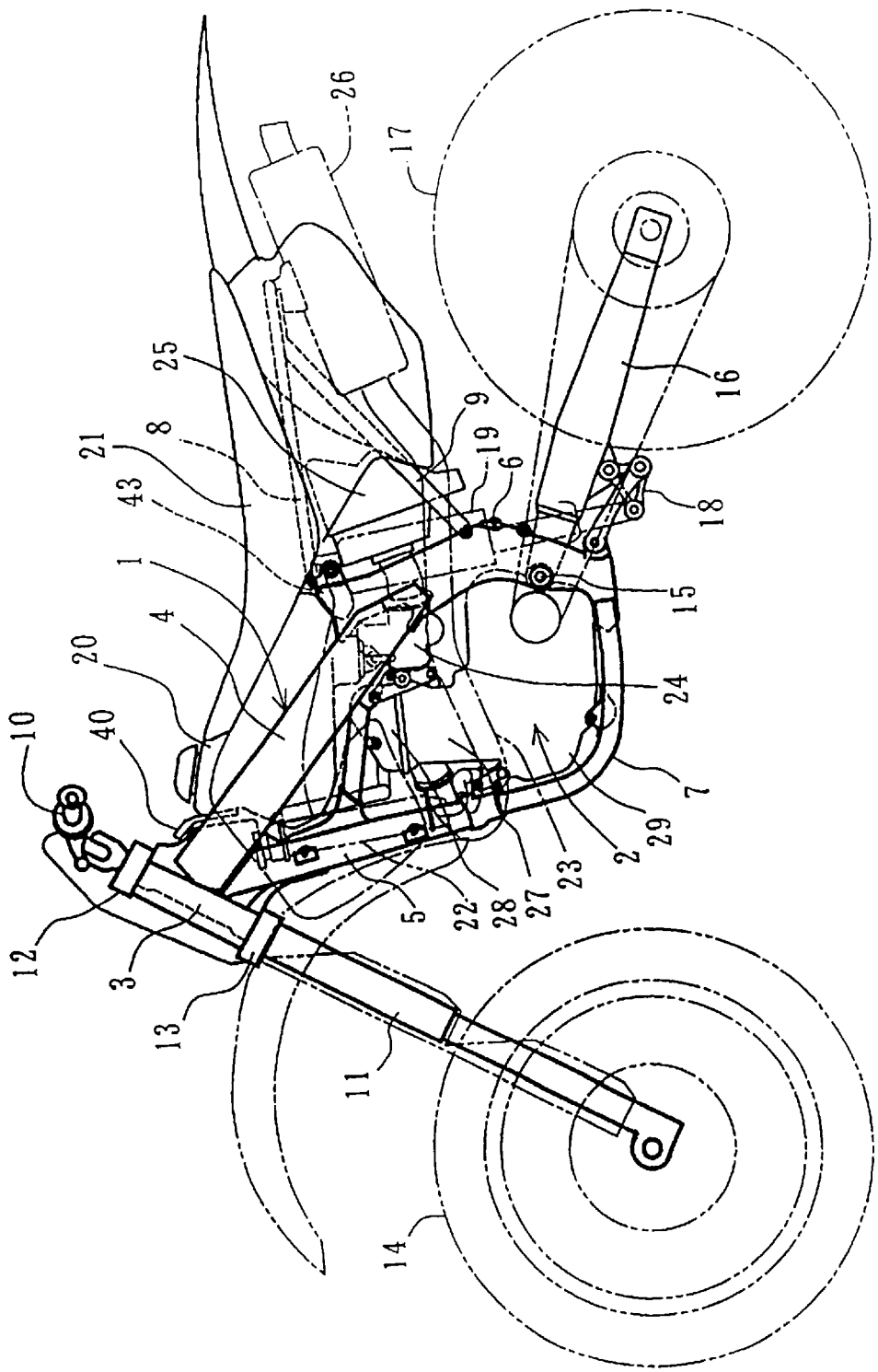
FIG. 1 is a left side view of an off-road type motorcycle, in accordance with the present invention.

Referring to FIG. 1, a motorcycle body frame 1 has a cradle shape and supports a water-cooled 4-cycle engine 2. The motorcycle body frame 1 includes a pair of left and right main frames 4. The left and right mainframes 4 extend from a headpipe 3, over the engine 2, to the rear of the vehicle.

A down tube 5 is positioned in front of the engine 2, and extends forward and downward from the head pipe 3 along the center of a motorcycle. A pair of left and right pivot plates 6 are coupled to rear ends of the right and left main frames 4. The left and right pivot plates 6 extend upward and downward behind the engine 2.

A pair of left and right lower frames 7 extend under the engine 2 and connect a lower end of the down tube 5 to the left and right pivot plates 6, respectively. A pair of seat rails 8 extend rearward from upper ends of the pivot plates 6. The pair of seat rails 8 have their rear ends connected to intermediate portions of the pivot frames 6 using an oblique rear pipe 9.

Left and right front forks 11 are movably supported by the head pipe 3 via top and bottom bridges 12 and 13. The left and right front forks 11 are steered by a handle bar 10. FIG. 1 also illustrates a front wheel 14.

A front end of a rear swing arm 16 is movably supported at the intermediate portions of the pivot frames 6 using a pivot shaft 15. A rear wheel 17 is supported by the rear end of the rear swing arm 16. A rear shock absorber or strut 19 is attached between a link 18 in front of the rear swing arm 16 and a rear cross member 43 at the upper ends of the pivot plates 6 (to be described later). The rear shock absorber or strut 19 and its connections are part of a rear wheel suspension system.

A fuel tank 20 is supported between the left and right main frames 4. A seat 21 is supported on the left and right seat rails 8. FIG. 1 also illustrates radiators 22, an exhaust pipe 23, a carburetor 24, an air cleaner 25, and a muffler 26 of the motorcycle.

Figure 2:
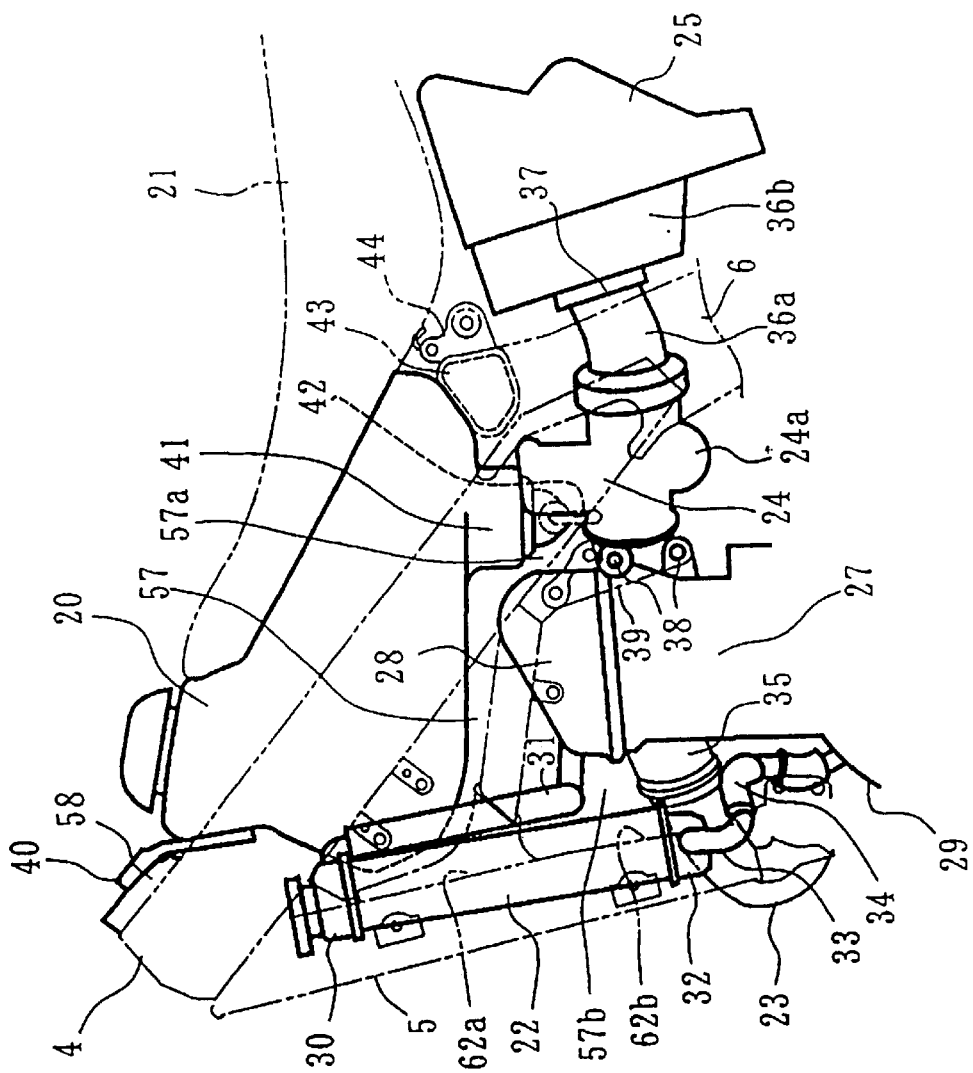
FIG. 2 is a left side view illustrating an arrangement of components positioned above an engine of the motorcycle.

As shown in FIG. 2, the engine 2 is a water-cooled 4-cycle engine, including a cylinder head 27 standing substantially upright. A cylinder head cover 28 is substantially triangular, when viewed from the left side of the motorcycle. The rear end of the cylinder head cover 28 extends into a space between the right and left main frames 4. An exhaust passage 35 is provided at the front center of the cylinder head 27, and connects to the exhaust pipe 23.

Figure 5:
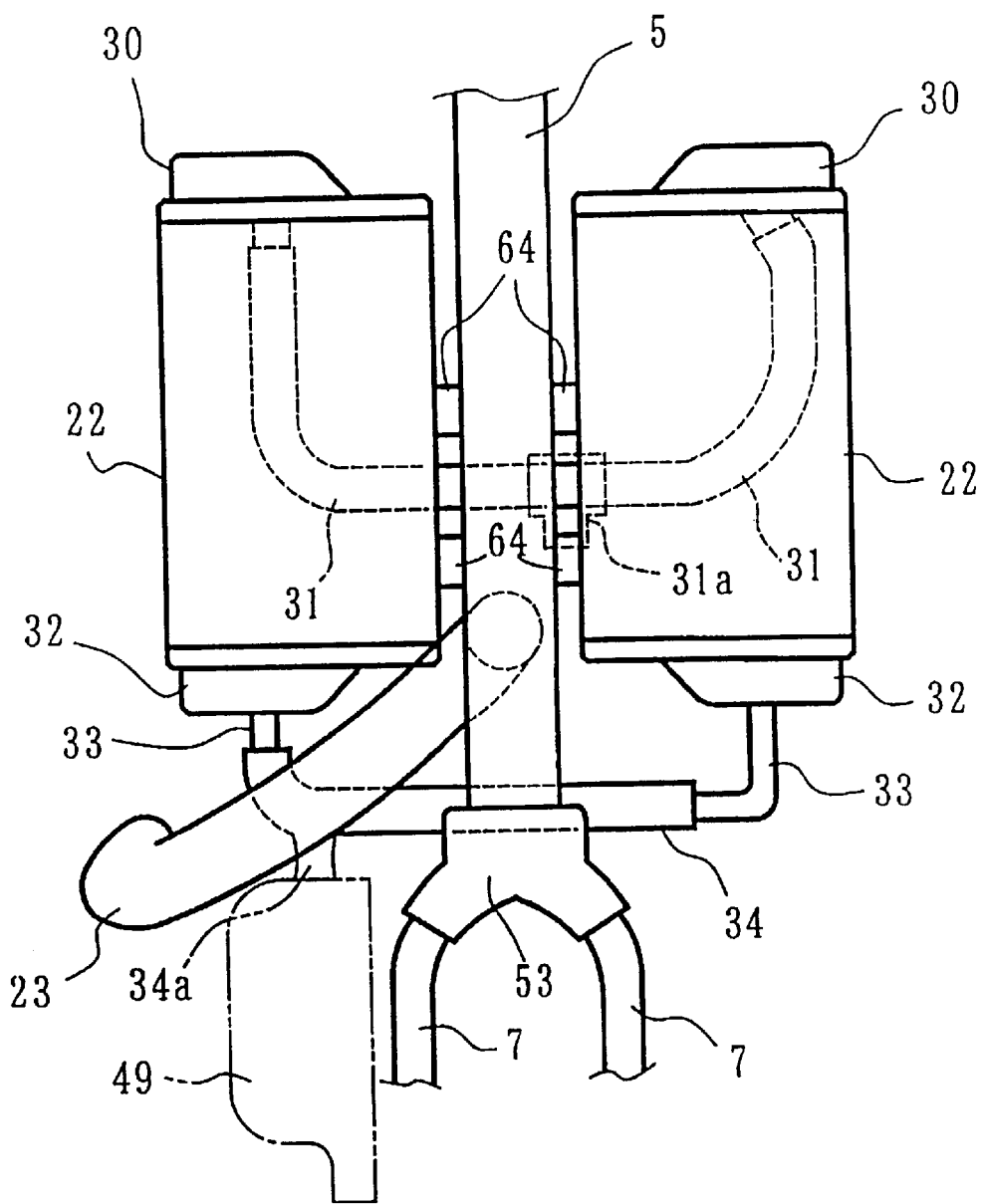
FIG. 5 is a close-up view of the components around a down tube of the motorcycle's frame.

As illustrated in FIG. 5, left and right radiators 22 are supported at opposite sides of the down tube 5. A return water hose 31 extends between upper tanks 30 of the radiators 22. A water hose 33 extends between lower tanks 32 of the radiators 22, and is connected to a crankcase 29 (see FIG. 2).

As illustrated in FIG. 2, the carburetor 24 is connected to an intake port on the rear surface of the cylinder head 27. The carburetor 24 has an intake upstream side thereof connected to a front part of the air cleaner 25 via a connecting tube 36. The connecting tube 36 extends across a part where the rear ends of the main frames 4 and the upper part of the pivot plates 6 are joined, when viewed from the left side of the motorcycle.

The connecting tube 36 is divided at the center thereof into a front part 36a and a rear part 36b. The rear part 36b is attached to the front part of the air cleaner 25. The front and rear parts 36a and 36b are detachably connected at a dividing position 37. The dividing position 37 is present behind the rear ends of the pivot plates 6, which enables the front and rear parts 36a and 36b to be easily assembled and maintained.

The fuel tank 20 has the front end thereof attached to a boss 58 at the upper part of the main frames 4 using a bracket 40, and a bolt or the like. A rear end of the fuel tank 20 is supported on a rear cross member 43 provided between the upper ends of the pivot plates 6. The fuel tank 20 has a projection 41 extending downward from it's rear lower part. A fuel cock 42 is attached to the bottom of the projection 41.

The projection 41 is positioned in a space 57a. The space 57a is defined behind the cylinder head 27 and cylinder head cover 28, which extend toward the top of the 4-cycle engine 2, and in front of the rear cross member 43. The projection 41 is as high as the head cover 28 along the length of the motorcycle, and overlaps with the upper part of the carburetor 24 when viewed from the left side of the motorcycle.

Figure 3:
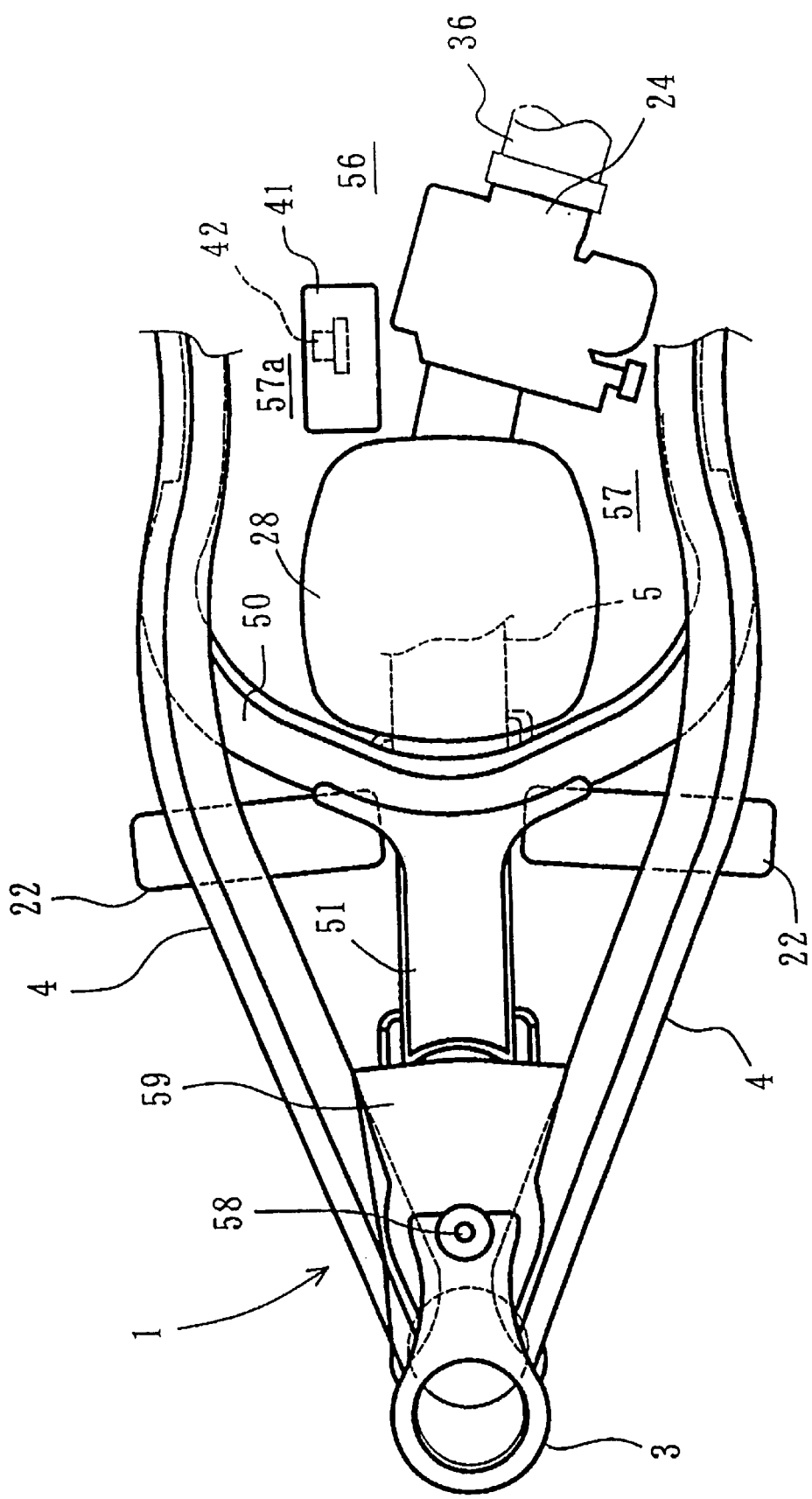
FIG. 3 is a plan view of the motorcycle, showing the layout of the components shown in FIG. 2.
Figure 4:
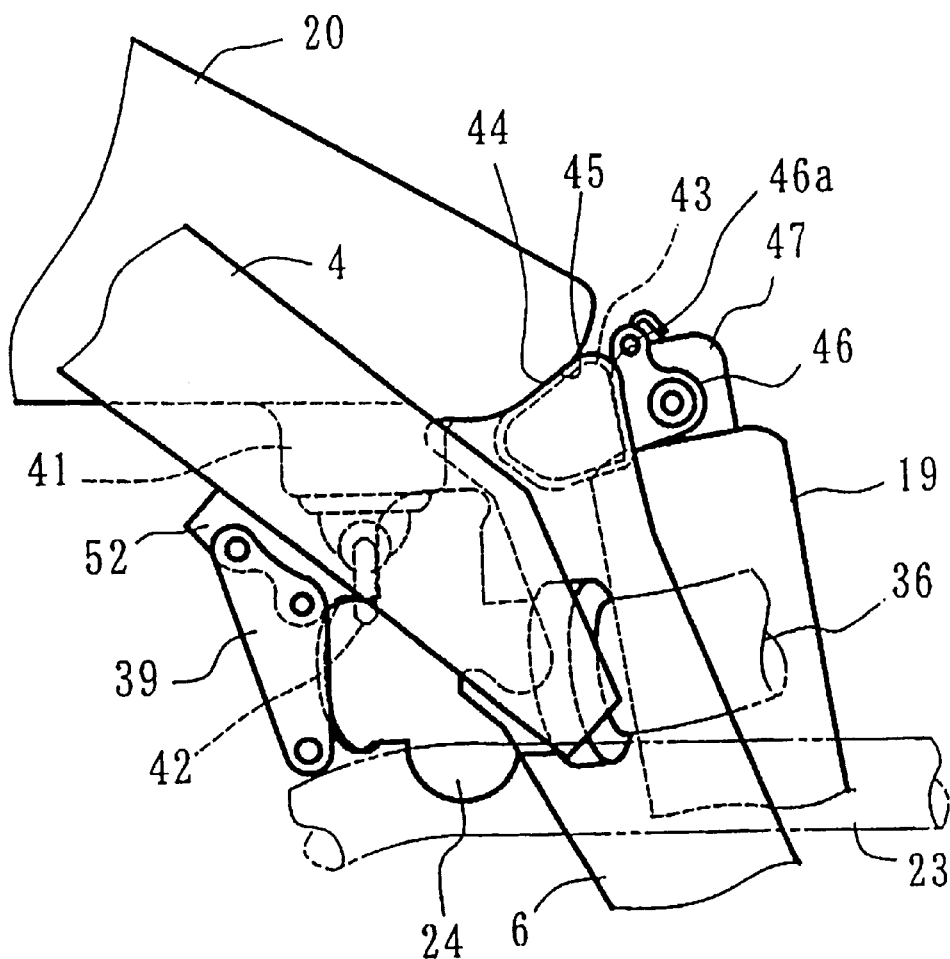
FIG. 4 is a left side view illustrating a layout of components positioned above pivot plates of a frame of the motorcycle.

Referring to FIG. 4, the fuel cock 42 is attached with the lower end thereof extending slightly downward from the lower edges of the main frames 4, when viewed from the left side of the motorcycle. Further, the projection 41 overlaps with the main frames 4, and is positioned beside the carburetor 24 in the widthwise direction of the body frame, as clearly shown in FIG. 3.

As shown in FIG. 1, the engine 2 has an upper part thereof supported by the right and left main frames 4. The front part of the engine 2 is supported by the lower part of the down tube 5. The lower part of the engine 2 is supported by the intermediate portions of the lower frames 7. Further, the crankcase 29 at the rear part of the engine 2 is supported by the right and left pivot plates 6, via the pivot shaft 15. As illustrated in FIGS. 2 and 4, the upper part of the engine 2 is supported by the underside of the right and left main frames 4 via a hanger bracket 39 using a support 38 provided at the rear part of the cylinder head 27.

FIG. 5 illustrates the layout of components near the down tube 5. FIG. 5 shows the arrangement of the radiators 22, down tube 5 and other peripheral components, viewed from the front part of the motorcycle. The upper tanks 30 of the left and right radiators 22 are connected by the return water hose 31, and communicate with a water jacket outlet near the cylinder head cover 28 via a joint tube 31a.

The water hose 33 extends from the lower tanks 32 toward the center of the motorcycle, and connects to a joint hose 34. The joint hose 34 crosses a rear part of a tapered portion 62b of the down tube 5, and reaches a water pump 49, at the right side of the crankcase, via a joint 34a which is positioned at the right side of the joint hose 34. The exhaust pipe 23 passes by the rear part of the tapered portion 62b, goes obliquely downward to the right side of the motorcycle, and extends rearward under the right radiator 22.

Figure 6:
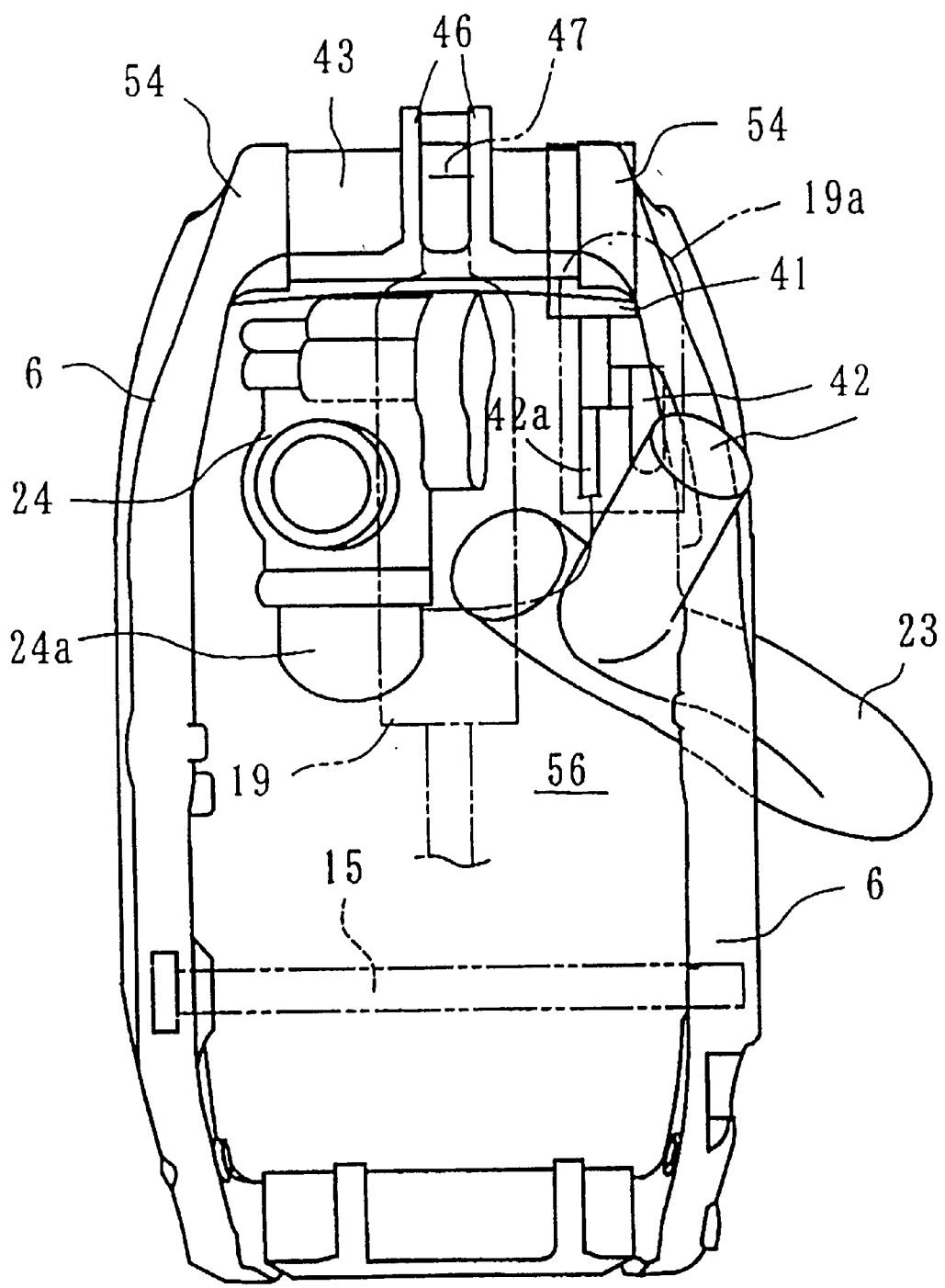
FIG. 6 illustrates a layout of components in a space under a rear cross member of the motorcycle's frame.

Various components are arranged in a space 56 defined under the rear cross member 43. FIG. 6 shows the layout of the components, viewed from the rear part of the motorcycle. In the space 56, the carburetor 24 is positioned near and under the rear cross member 43, and slightly to the left side of the motorcycle body. The projection 41 is positioned at the right side of the carburetor 24. The fuel cock 42 is positioned under the projection 41. A fuel pipe 42a extends downward from the fuel cock 42 and connects to a float chamber 24a of the carburetor 24. The fuel cock 42 is at a level slightly higher than that of the float chamber 24a.

The rear shock absorber 19 is positioned behind the foregoing components and near the center of the motorcycle. The fuel cock 42 overlaps with the front part of a reserve tank 19a, which is juxtaposed with the rear shock absorber 19. The exhaust pipe 23 extends under the fuel cock 42 and the reserve tank 19a. The front part of the exhaust pipe 23 extends obliquely rightward from the front part of the cylinder head 27, then bends toward the center of the motorcycle (see FIG. 5). The exhaust pipe 23 then passes by the inner side of the right pivot plate 6, and under the fuel cock 42 and the reserve tank 19a as described above. The exhaust pipe 23 then bends slightly to the right side of the motorcycle, and extends upwards and rearwards. The connecting tubes (not shown in FIG. 6) connecting to the carburetor 24 and the exhaust pipe 23 are positioned at the opposite sides of the rear shock absorber 19, respectively.

The structure of the motorcycle body frame 1 will be described with reference to FIGS. 7 to 10. The right and left main frames 4 are made of an aluminum alloy, or the like, which is extruded to have a rectangular cross section. The right and left main frames 4 have their front ends welded to the head pipe 3, and their rear ends welded to the upper parts of the pivot plates 6.

The down tube 5 is a square pipe made of an aluminum alloy or the like, and has its rear lower part tapered by swaging. The rear upper part of the down tube 5 and the center undersides of the left and right main frames 4 are reinforced by a tension pipe 50. The tension pipe 50 is substantially horizontal when viewed from the left side of the motorcycle, and is curved to the front part of the motorcycle.

The tension pipe 50 has its front end coupled to the down tube 5 using a gusset 51, and its rear end welded to the main frames 4. A stay 52 of the hanger bracket 39 is attached to the welded portion of the tension pipe 50 and the main frames 4. The lower part of the down tube 5 is welded to the front parts of the lower frames 7 via a joint 53. The lower frames 7 are square pipes made of an aluminum alloy or the like and branched to the left and right (see FIGS. 8 and 9).

Figure 10:
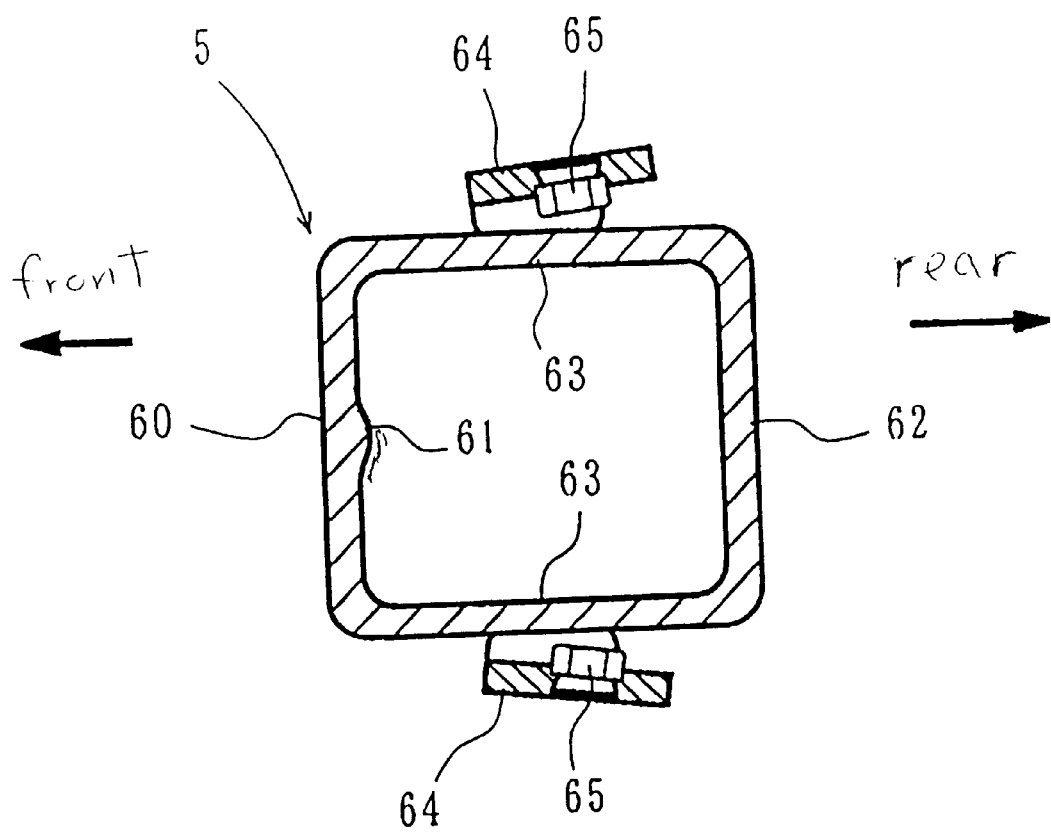
FIG. 10 is a cross sectional view, taken along line 10—10, in FIG. 7.

FIG. 10 is a cross section of the down tube 5. The down tube 5 has four sides, i.e., a front side 60, a rear side 62, and left and right sides 63. A rib 61 is formed on the inner center surface of the front side 60 as an integral part. The rib 61 extends along the length of the down tube 5. The lower half of the rear side 62 has the downwardly tapered portion 62b, while an upper surface 62a of the front half of the rear side 62 is straight. Radiator attachments 64, substantially in the shape of the letter L, are welded to the outer surfaces of the left and right sides 63. The radiator attachments 64 have weld nuts 65, in order to bolt the left and right radiators 22.

Figure 7:
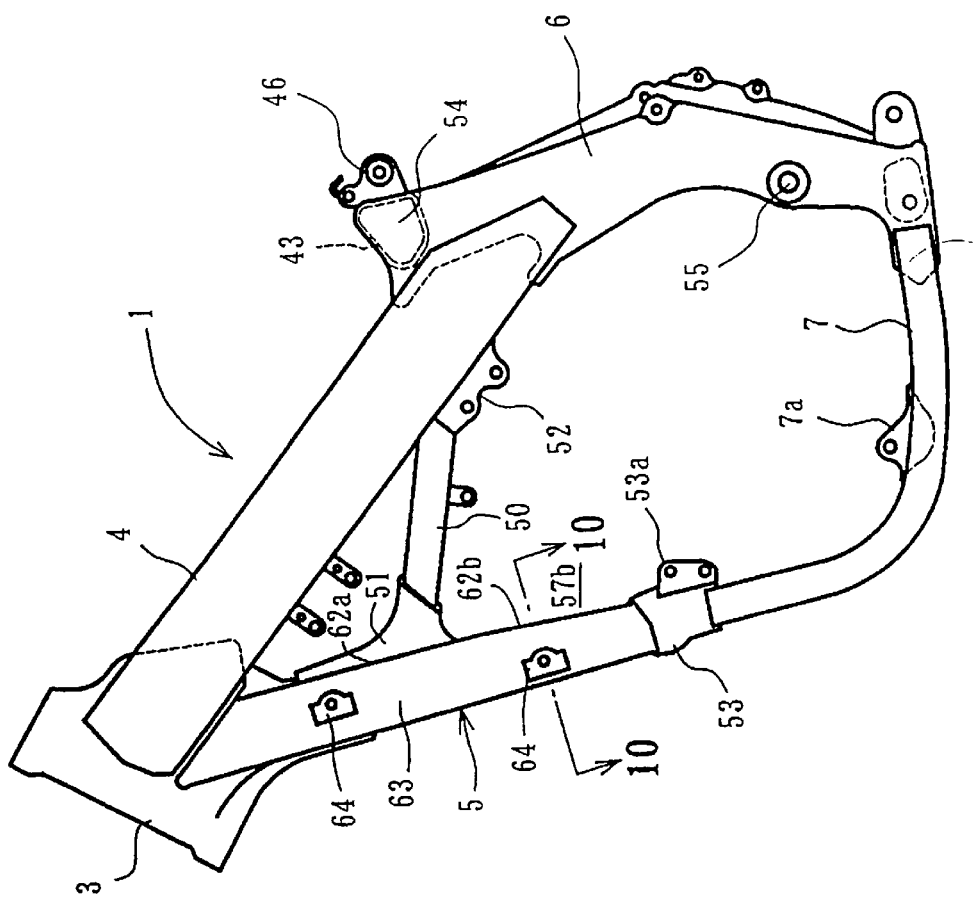
FIG. 7 is a left side view of several parts of the motorcycle's frame.

As shown in FIG. 7, only the rear side 62 of the down tube 5 has the tapered part 62b, thereby enlarging the space 57b (shown in FIG. 2) defined by the tapered part 62b, the cylinder head 27 and the front part of the cylinder head cover 28. The upper surface 62a of the rear side 62, the front side 60, and the left and right sides 63 are not tapered, but straight. In other words, the down tube 5 is not symmetrical due to the presence of the tapered part 62b, when viewed from the left side of the motorcycle.

The down tube 5 is made as follows. First of all, a square pipe having a cross section with the rib 61, as the integral part, is extruded and is orthogonally swaged in four directions. This procedure allows the down tube 5 to have a particular side tapered to a desired length. The swaging process is well-known, and is effective in optionally and partially changing a thickness of one side of the down tube 5, so that the rib 61 can be easily formed.

The pivot plates 6 are made by a process such as casting or forging an aluminum alloy. The pivot plates 6 are in the shape of a plate, and have upper ends 54 extending higher than the rear ends of the main frames 4. The upper ends 54 are curved inward (see FIGS. 8 and 9), and have recesses on their curved surfaces. The opposite ends of the rear cross member 43 are fitted into these recesses and are welded therein. Pivot receptacles 55 are formed under the centers of the pivot plates 6, thereby receiving the opposite ends of the pivot shaft 15.

The rear cross member 43 is made by a process such as casting or forging an aluminum alloy or the like. The rear cross member 43 is preferably hollow. The rear cross member 43 receives the rear end 45 of the fuel tank 20 on the upper surface 44 thereof. A center of the rear cross member 43 includes a forked shock absorber bracket 46 as an integral part. The shock absorber bracket 46 extends rearward, and movably supports an upper end of the rear shock absorber 19. The rear shock absorber bracket 46 is slightly offset from the center C of the motorcycle, and is positioned in order to minimize the offset. The shock absorber bracket 46 has on its upper part an opening 46a for mounting the seat rails 8 (see FIG. 4).

Figure 8:
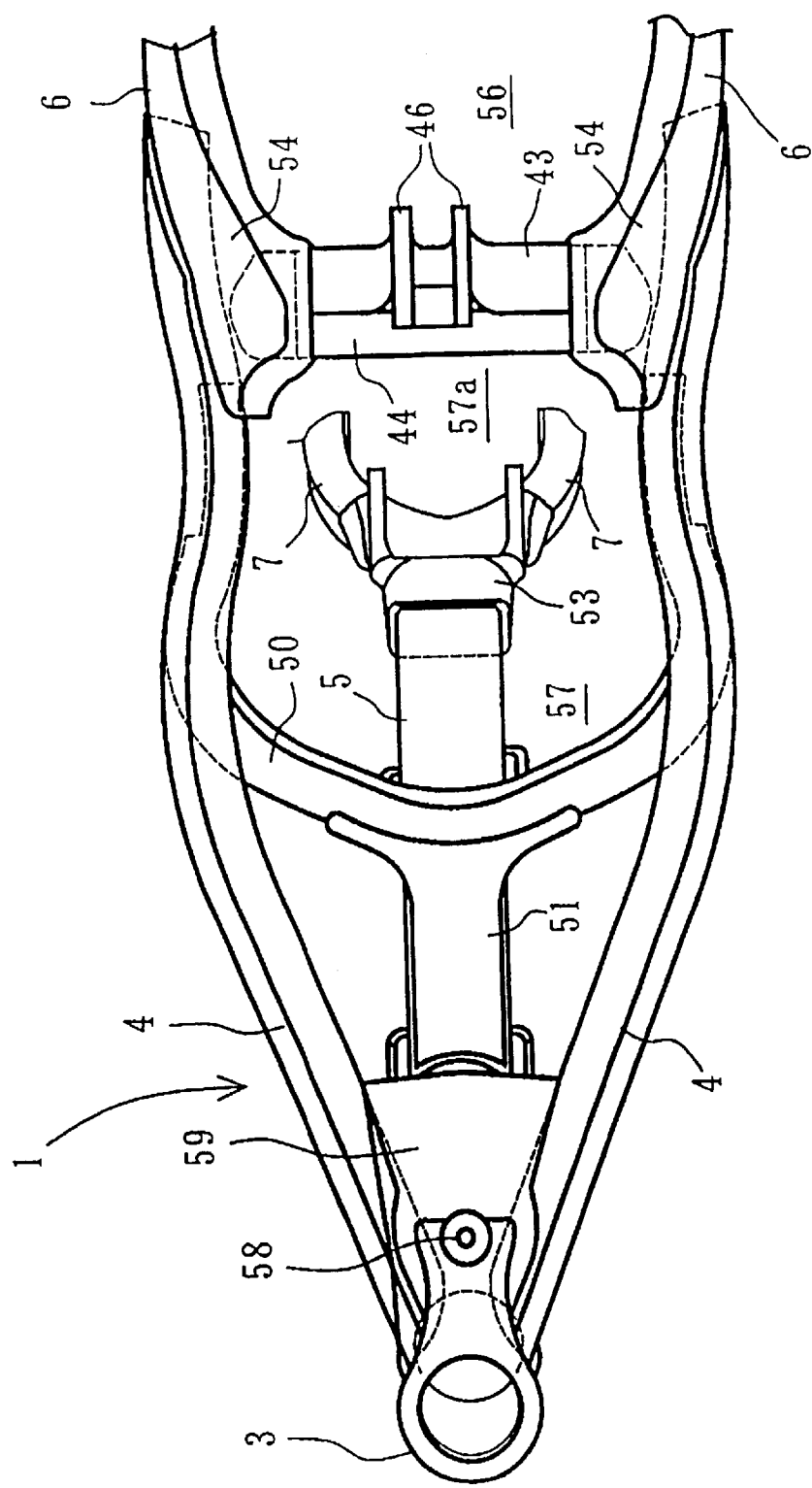
FIG. 8 is a plan view of the front part of the motorcycle's frame.

As illustrated in FIG. 6, the space 56, defined under the rear cross member 43 and between the left and right pivot plates 6 and the pivot shaft 15, is very large. The space 56 houses the rear shock absorber 19, exhaust pipe 23 and connecting tube 36. As illustrated in FIG. 8, the large space 57 in front of the rear cross member 43 extends above the tension pipe 50 and behind the head pipe 3, and houses the fuel tank 20 therein. A rear cylinder space 57a is present at the rear part of the space 57, i.e. behind the cylinder head cover 28 of the engine 2 (see FIG. 3).

Figure 9:
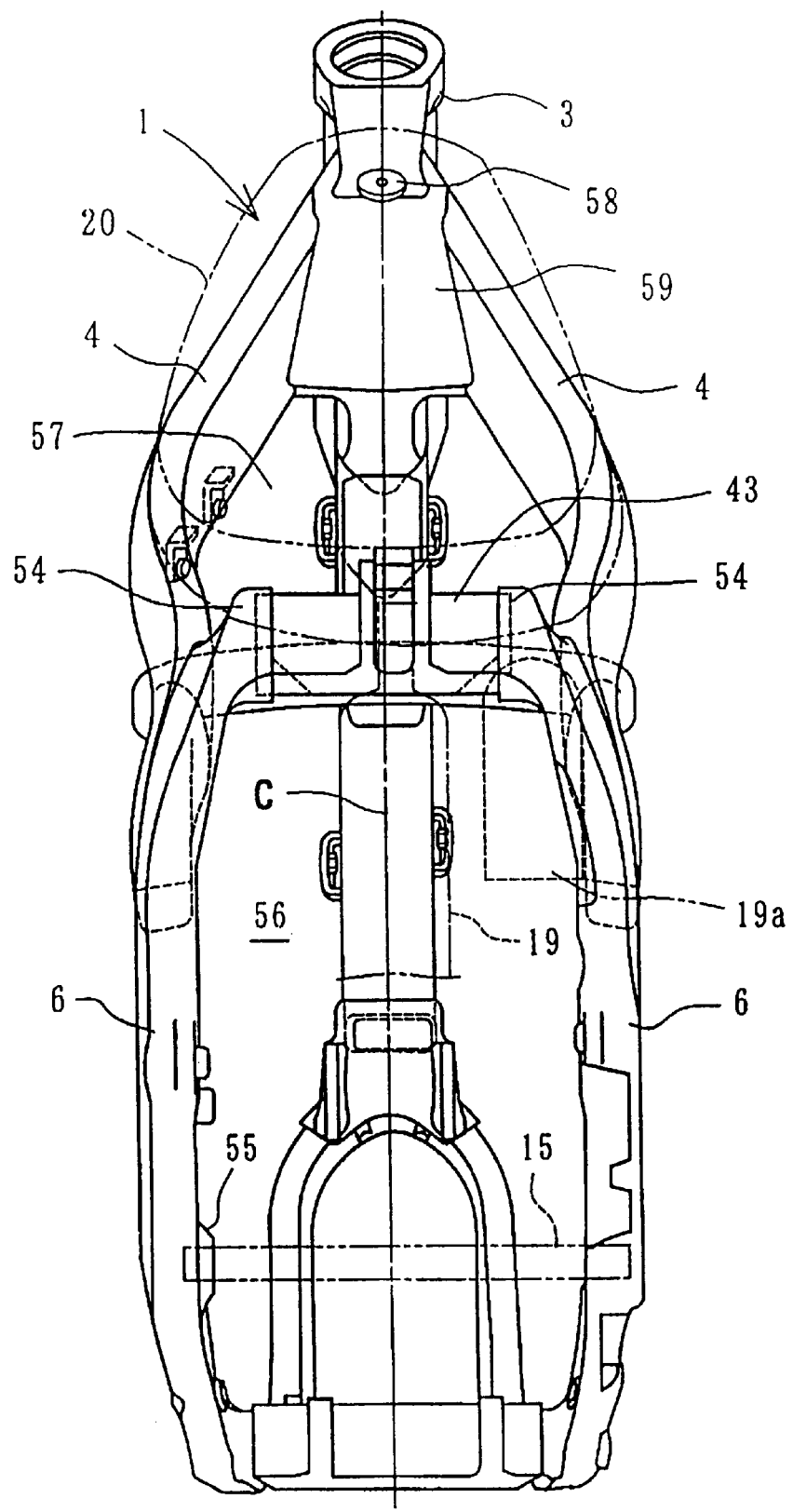
FIG. 9 is a plan view of the rear part of the motorcycle's frame.

FIGS. 8 and 9 illustrate a boss 58 for attaching the bracket 40 integrally with the head pipe 3. A cross member 59 extends from the rear part of the head pipe 3, as an integral part. The cross member 59 joins the left and right main frames 4. As illustrated in FIG. 7, a stay 53a is provided at the joint 53 in order to support the engine 2. Also, stays 7a are provided at the lower frames 7 in order to support the engine 2.

Now, an example of an operation of the present invention will be described. Referring to FIGS. 2 and 4, the downward projection 41 provided on the bottom towards the rear of the fuel tank 20 is effective in increasing the capacity of the fuel tank 20. The fuel tank 20 can have a relatively larger capacity without becoming taller. This enables the riding position and seat 21 to be secured relatively near the front part of the motorcycle body. This reduces variations of the center of gravity caused by an amount of fuel remaining in the fuel tank 20, and/or changes of a riding position of the rider, and so on.

As shown in FIGS. 3 and 6, the projection 41 and carburetor 24 are juxtaposed across the motorcycle body so that the space 57a in front of the carburetor 24 can be effectively used. Further, the space 57a is also present behind the cylinder head 27 and cylinder head cover 28, and in front of the rear cross member 43, and is effective in preventing the positions of the cylinder head 27 and cylinder head cover 28 of the 4-cycle engine 2 from being raised.

The fuel cock 42 is attached under the projection 41, i.e. the fuel cock 42 is positioned beside the carburetor 24. The arrangement effectively uses the space 57a, and improves layout tolerance for the fuel cock 42. The fuel cock 42 is positioned at a low level near the float chamber 24a, which is effective in reducing a length of a fuel pipe 42a extending from the fuel cock 42 to the carburetor 24 and in facilitating the installation of the fuel pipe 42a. Further, since the fuel cock 42 is present at the bottom of the fuel tank 20, little air will be sucked, even if the fuel level fluctuates when there is a small amount of fuel in the fuel tank 20.

As illustrated in FIG. 6, the exhaust pipe 23 is installed in the space under the fuel cock 42 and the reserve tank 19a, which facilitates the installation of the exhaust pipe 23, and promotes effective use of the available space.

Still further, the fuel cock 42 has its bottom positioned near the lower edges of the main frames 4. This enables the fuel cock 42 to be at a manually accessible position even if the main frames 4 have a rectangular cross section. In addition, the fuel cock 42 can be manipulated from the right side of the motorcycle body, which is opposite to the left side where the carburetor 24 is positioned. Therefore, the fuel cock 42 can be maintained without being affected by the carburetor 24.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A motorcycle comprising:

an engine;

right and left main frames extending above said engine in lengthwise direction of the motorcycle;

a fuel tank mounted above said engine, and between said left and right main frames, said fuel tank including a downward extending portion at a rear portion of said fuel tank;

a fuel cock attached to said downward extending portion of said fuel tank, wherein said fuel cock is manually accessible from beneath one of said right and left main frames;

a rear cross member extending across said motorcycle, wherein said engine includes a cylinder head cover, and wherein said downward extending portion is located behind said cylinder head cover and in front of said rear cross member, in reference to a normal travel direction of said motorcycle;

a right pivot plate connected to said right main frame; and a left pivot plate connected to said left main frame, wherein said rear cross member connects said right pivot plate to said left pivot plate.

2. The motorcycle according to claim 1, wherein said fuel cock extends at least partially below said left main frame.

3. The motorcycle according to claim 1, wherein said fuel tank is supported on said rear cross member.

4. The motorcycle according to claim 1, further comprising:

an exhaust pipe of said engine extending under said fuel cock.

5. The motorcycle according to claim 1, wherein said left and right main frames have rectangular cross sections.

6. The motorcycle according to claim 1, wherein said fuel cock is located at a lowest portion of said fuel tank.

7. The motorcycle according to claim 1, further comprising:

a carburetor communicating fuel from said fuel cock to said engine.

8. The motorcycle according to claim 7, wherein said carburetor includes a float chamber, and wherein said fuel cock is at a level slightly higher than said float chamber of said carburetor.

9. A motorcycle comprising:

an engine;

right and left main frames extending above said engine in lengthwise direction of the motorcycle;

a fuel tank mounted above said engine, and between said left and right main frames, said fuel tank including a downward extending portion at a rear portion of said fuel tank;

a fuel cock attached to said downward extending portion of said fuel tank, wherein said fuel cock is manually accessible from beneath one of said right and left main frames a rear cross member extending across said motorcycle;

a right pivot plate connected to said right main frame; and a left pivot plate connected to said left main frame, wherein said rear cross member connects said right pivot plate to said left pivot plate.

10. The motorcycle according to claim 9, wherein said fuel cock extends at least partially below said left main frame.

11. The motorcycle according to claim 9, wherein said fuel tank is supported on said rear cross member.

12. The motorcycle according to claim 9, further comprising:

an exhaust pipe of said engine extending under said fuel cock.

13. The motorcycle according to claim 9, wherein said left and right main frames have rectangular cross sections.

14. The motorcycle according to claim 9, wherein said fuel cock is located at a lowest portion of said fuel tank.

15. The motorcycle according to claim 9, further comprising:

a carburetor communicating fuel from said fuel cock to said engine.

16. The motorcycle according to claim 15, wherein said carburetor includes a float chamber, and wherein said fuel cock is at a level slightly higher than said float chamber of said carburetor.

* * * * *